United States Patent [19]

Ogawa

[11] 4,455,070
[45] Jun. 19, 1984

[54] COMPENSATING CIRCUIT FOR AN INFRARED-RAY SIGNAL DETECTION DEVICE IN AN AUTO FOCUS CAMERA

[75] Inventor: Masahiko Ogawa, Tokyo, Japan

[73] Assignee: Canon Kabushiki Kaisha, Tokyo, Japan

[21] Appl. No.: 337,457

[22] Filed: Jan. 6, 1982

[30] Foreign Application Priority Data

Jan. 16, 1981 [JP] Japan .................. 56-5635

[51] Int. Cl.³ ............................ G03B 7/08
[52] U.S. Cl. ................................ 354/403
[58] Field of Search ...................... 354/25 A

[56] References Cited
U.S. PATENT DOCUMENTS 4,288,152  9/1981  Matsuda ............. 354/25 A

*Primary Examiner*—Russell E. Adams
*Attorney, Agent, or Firm*—Toren, McGeady and Stanger

[57] ABSTRACT

In an auto focus type camera employing an intermittent infrared-ray light to an object to be photographed and which uses the reflected intermittent light from the object as a focusing signal, a signal detecting device is employed. The signal detecting device detects the signal from a signal source oscillating with a certain determined frequency and includes a detecting circuit, a driving power source for the detecting circuit and a signal producing circuit. The signal producing circuit produces a quasi-signal equivalent to a fluctuation signal from the detecting source which depends upon the fluctuation of the driving power source for the detecting circuit. The fluctuation signal from the detecting source is thus compensated by the quasi-signal from the signal producing circuit. Thus the effect of the fluctuation of the power source is substantially eliminated.

11 Claims, 2 Drawing Figures

COMPENSATING CIRCUIT FOR AN INFRARED-RAY SIGNAL DETECTION DEVICE IN AN AUTO FOCUS CAMERA

BACKGROUND OF THE INVENTION

1. Field of the Invention

The present invention relates to a device for detecting the signal (hereinafter called signal dectecting device) from a signal source oscillating with a certain determined frequency (for example an infrared-ray light emitting diode), particularly the compensation circuit of such a device.

2. Description of the Prior Art

In the case where the input signal of the signal detecting device (for example the active type automatic focussing device having a light source for a camera, which is so designed that a light is emitted from a light source forward of the object, whereby the light reflected from the object is made use of for focus detection) for detecting the weak signal from a signal source (for example, an infrared-ray light emitting diode) oscillating with a certain determined frequency, a synchronization detecting system is normally adopted in order to improve the measuring accuracy.

Because the signal source of the above-mentioned signal detecting device oscillates with a certain determined frequency, the output of the power source battery fluctuates in synchronization with the oscillation, whereby further, in synchronization of the fluctuation of the output voltage, the driving voltage of the signal detecting circuit also fluctuates. Consequently, when the above-mentioned system is made use of, the wrong measurement due to the fluctuation of the driving voltage can not be avoided, although the noise component in the input signal can be eliminated.

Thus, there has been an attempt to connect a filter to the power source of the signal detecting device to check the output fluctuation of the power source battery. As a result, in order to obtain a high precision measurement result, the construction of the filter becomes complicated, and the manufacturing cost becomes unduly high.

SUMMARY OF THE INVENTION

It is, accordingly, an object of the present invention to provide a compensating circuit for a focussing signal detection device in a camera which obviates the disadvantages of prior art devices.

It is another object of the invention to provide a simple signal detecting device, free from the shortcomings of the conventional signal detecting device, by means of which a high precision measurement result can be obtained.

These and further objects and features of the invention will become apparent from the following detailed description of embodiments thereof taken in connection with the accompanying drawings.

(b) shows the fluctuation wave form of the battery voltage due to the flicker of the diode.

(c) shows the supply voltage wave form, the battery voltage smoothed with the CR filter.

(d) shows the quasi-signal wave form from the detecting circuit due to the supply voltage (c).

(e) shows the detected signal wave form from the detecting circuit due to the photo-current ip by the flickering infrared-ray light.

(f) shows the output wave form of the detecting circuit, whereby the detected signal (e) is added to the quasi-signal (c).

BRIEF DESCRIPTION OF THE PREFERRED EMBODIMENT

Below, the present invention will be explained in accordance with the accompanying drawing of the embodiment hereof.

Figure 1:
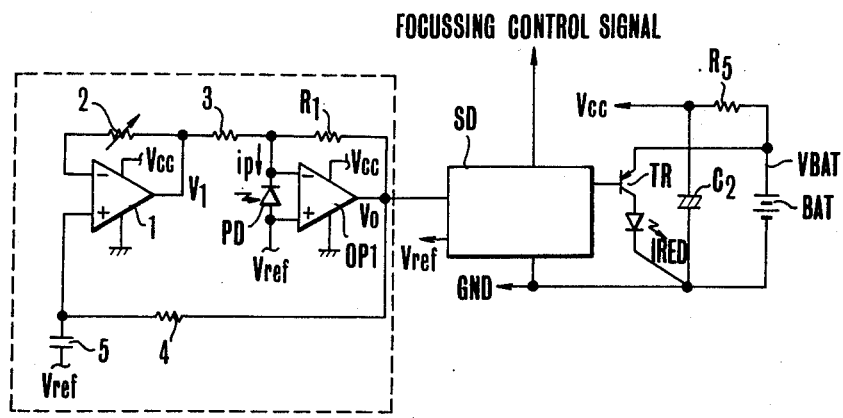
FIG. 1 shows the circuit diagram of an embodiment of the automatic focussing device in accordance with the present invention for a camera.

FIG. 1 shows the electrical circuit of an embodiment of the automatic focussing device in accordance with the present invention for a camera. In the drawing, BAT is the battery, to which a one step power source filter consisting of the resistance R5 and the capacitor C2 is connected in parallel. The output voltage VCC of the power source filter is delivered to the circuits to be explained below as the driving voltage. IRED is the LED connected in parallel to the battery through the switching transistor TR so as to emit the ultra-red ray in such a manner that the ultra-red ray emitted from the IRED is reflected from the object so as to be made use of as the distance signal. The OP1 is the operational amplifier, having differential input terminals between which the photo-diode PD is connected so as to convert the ultra-red ray emitted from the IRED and reflected from the object into an electrical signal, while the resistance R1 is connected to the feed back path. Further, the power source terminal of the amplifier OP1 is, as is shown in the drawing, connected to the output terminal of the power source filter, while the non-inverting input terminal (+) is connected to the standard voltage source Vref. SD is the synchronization detecting circuit which delivers pulses with a certain determined frequency to the base of the above-mentioned switching transistor TR and detects only the signal in synchronization with the pulse signal for exciting the IRED out of the output signal VO from the operational amplifier OP1 constituting the detecting circuit. The output of the synchronization detecting circuit SD is delivered to a device not shown in the drawing so as to be made use of as the signal for the distance up to the object. Elements 1–5 are the elements of the compensation circuit. Element 1 is an operational amplifier; element 2 the variable resistance connected to the feed back path of the operational amplifier 1 so as to alter the output characteristics of the amplifier; element 3 is a resistance; element 4 is a resistance connected between the output terminal of the operational amplifier OP1 and the non-inverting input terminal of the operational amplifier 1; element 5 is a capacitor connected between the standard voltage source Vref and the non-inversing input terminal (+) of the amplifier 1. Hereby, the resistance 4 and the capacitor 5 constitute a low pass filter for feeding the low frequency component (due to the fluctuation of the sun light or room light) of the output VO of the operational amplifier back to the operational amplifier 1 so as to eliminate the high frequency component (due to the flickering infrared-ray light).

Below, the operation of the automatic focussing device for the camera will be explained.

When the LED IRED flickers with the frequency fc through the transistor TR for automatic focussing, a part of the infrared-ray light emitted from the IRED and reflected from the object (not shown in the drawing) is incident upon the photo diode PD which produces a photo current ip corresponding to the incident light. The photo current ip, which has been converted into the operational amplifier OP1, is delivered to the synchronization detecting circuit SD. The synchronization detecting circuit SD detects the input signal in synchronization with the flickering of the LED IRED so as to deliver the signal of the distance up to the object to a device (not shown in the drawing) in order to control the focussing.

Below, the output VO of the operational amplifier OP1 will be explained in detail.

Figure 2:
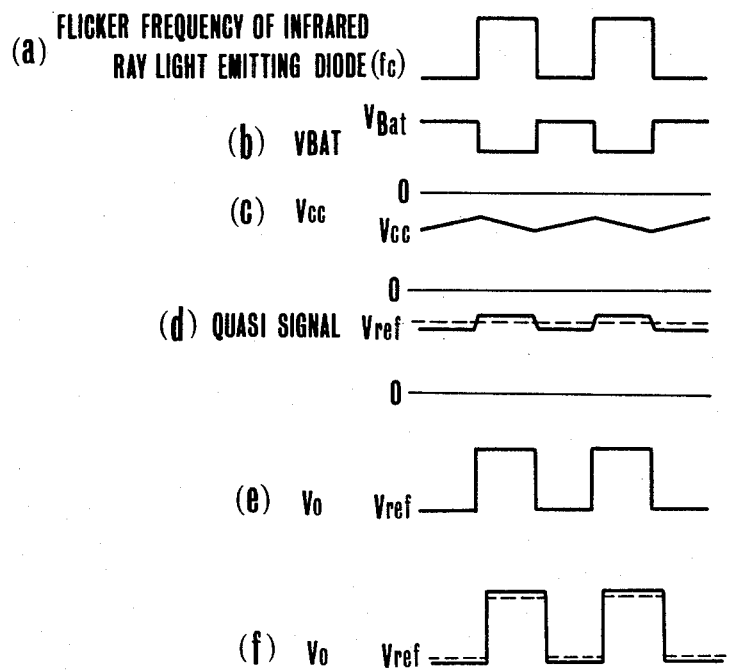
FIG. 2 shows the wave forms at various parts of the circuit shown in FIG. 1, whereby (a) shows the flicker frequency wave form of the infrared-ray light emitting diode.

When the LED IRED flickers with the frequency fc as is shown in FIG. 2(a), the output voltage VBAT of the battery BAT varies in synchronization of the LED IRED due to the internal resistance of the battery BAT as is shown in FIG. 2(b). However, the voltage VBAT is delivered through the power source filter C2 and R5 as the voltage VCC, which assumes the smoothed form as is shown in FIG. 2(c). When the thus fluctuating voltage VBAT is delivered to the input terminal of the power source terminal of the operational amplifier OP1, the output VO of the operational amplifier OP1, to which the circuit consisting of 1-5 as the compensation circuit of the signal detecting circuit is not connected, is not the voltage corresponding only to the photo-current ip (FIG. 2(e)) but the one depending upon the fluctuation of the power source voltage VCC (FIG. 2(d)). Namely, it assumes the signal form with the wrong level as is shown in FIG. 2(f).

Consequently, when this voltage is detected with the synchronization detecting circuit of the next step, there is a danger that a focussing control signal with wrong level should be produced or that, when the infinite distance is focussed, a quasi-focussing signal as is shown in FIG. 2(d) as if a certain distance is focussed should be produced, which leads to the wrong focussing control.

However, in accordance with the circuit shown in FIG. 1, the quasi-focussing signal V1, (FIG. 2(d)) from the operational amplifier 1, depending upon the fluctuation of the power source voltage VCC is delivered to the inverting input terminal of the operational amplifier through the resistance 3 and added to the output signal of the operational amplifier OP1, so that the operational amplifier OP1 delivers a correct signal corresponding to the photo-current ip, whereby the signal depending upon the fluctuation of the power source voltage VCC is eliminated.

Further, if the operational amplifier OP1, and element 1 are constructed in the same way and have the same efficiency, R2=R3 (R2: value of the resistance 2, R3: value of the resistance 3) and the signal component due to the fluctuation of the power source voltage VCC can nearly be eliminated.

Accordingly, even when the operational amplifiers OP1 and 1 are constructed in a different way and do not have the same efficiency, it is possible to eliminate the signal component due to the fluctuation of the power source voltage VCC by making the amplifier 1 produce a signal equivalent to that produced with the operational amplifier OP1 depending upon the fluctuation of VCC, whereby the resistance 2 is constructed as variable resistance.

What is claimed is:

1. A signal detecting device for detecting the signal from a signal source oscillating with a certain determined frequency, comprising:
    a detecting circuit;
    a driving power source for said detecting circuit; and
    a signal producing circuit for producing a quasi-signal equivalent to a fluctuation signal from the detecting circuit depending upon the fluctuation of the driving power source for the detecting circuit, said fluctuation signal from the detecting circuit being compensated with the quasi-signal from the signal producing circuit.

2. A device in accordance with claim 1, wherein the signal producing circuit is driven with the driving power source.

3. A device in accordance with claim 1, wherein the quasi-signal from the signal producing circuit is delivered to the detecting circuit.

4. A device in accordance with claim 1, wherein the detecting circuit includes an operational amplifier, while the output of the signal producing circuit is connected to the inverting input terminal of the operational amplifier.

5. A device in accordance with claim 2, wherein the signal producing circuit includes an operational amplifier.

6. A compensating device for a signal detection device for a camera comprising:
    (a) signal forming means for producing a signal oscillating with a predetermined frequency;
    (b) signal detecting means for detecting the signal from said signal forming means;
    (c) an electrical power source of which the voltage varies because electrical power is supplied to said signal forming means, and which also supplies electrical power to said signal detecting means;
    (d) quasi-signal forming means for producing a quasi-signal which cancels out that signal of the output of said signal detecting means which depends on the fluctuation of said electrical power source; and
    (e) means for combining the output of said signal detecting means with the output of said quasi-signal forming means to produce an output signal free from the fluctuation of said electrical power source.

7. A compensating device for a signal detection device for a camera of claim 6, wherein said camera projects light onto an object being photographed and receives its reflected light by a photosensitive element so that distance measuring is performed, and wherein said signal forming means includes:
    (a) means for producing a train of pulses with a predetermined frequency; and
    (b) light emitting means whose operation is controlled by said pulse forming means, and wherein said signal detector includes light receiving means receptive of the light from said light emitting means for producing an output signal corresponding to the brightness of said light.

8. A compensating device for a signal detection device for a camera of claim 7, wherein said quasi-signal forming means includes means for producing an output representing the inverted phase of the voltage of said electrical power source or battery.

9. A camera having the active type auto focus function comprising:
  (a) light emitting means for producing light with a predetermined frequency;
  (b) distance measuring means for producing a signal representing the distance from the camera to an object to be photographed by using the output of the photosensitive means positioned to receive the reflected light from the object onto which light from said light emitting means is projected;
  (c) an electrical power source circuit connected to said light emitting means upon supply of electrical power to vary its output voltage at said predetermined frequency and connected to also supply electrical power to said distance measuring means; and
  (d) compensating means for producing a signal of opposite variation to that of the voltage of said electrical power source circuit so that when said signal is applied to said distance measuring means, that component of the distance measuring signal produced from said distance measuring means which varies with variation of the voltage of said electrical power source circuit is cancelled.

10. A camera having the active type auto focus function comprising:
  (a) light emitting means for producing light with a predetermined frequency;
  (b) photosensitive means positioned to receive the reflected light from an object to be photographed as light from said light emitting means is projected thereon and biased to a predetermined voltage;
  (c) a battery circuit connected to said light emitting means upon supply of electrical power to vary its voltage at said predetermined frequency and connected to apply a bias voltage to said photosensitive means;
  (d) compensating means for producing a voltage opposite in phase to the voltage of said battery circuit by which said photosensitive means is biased so that said photosensitive means is biased so that said photosensitive element is biased to a constant voltage; and
  (e) distance measuring means responsive to the output of said photosensitive means for producing a signal representing the distance from the camera to the object.

11. A camera having the active type auto focus function of claim 10, wherein said distance measuring means comprises:
  (a) signal processing means for processing the output of said photosensitive means by synchronizing detection to said predetermined frequency; and
  (b) a distance measuring circuit for producing a distance measuring signal from the output of said signal processing means.

* * * * *